(12) United States Patent
Iio et al.

(10) Patent No.: US 7,317,848 B2
(45) Date of Patent: Jan. 8, 2008

(54) OPTICAL SWITCH

(75) Inventors: Shinji Iio, Musashino (JP); Masayuki Suehiro, Musashino (JP); Shin-ichi Nakajima, Musashino (JP); Yoshiyuki Asano, Musashino (JP); Chie Sato, Musashino (JP); Akira Miura, Musashino (JP); Tsuyoshi Yakihara, Musashino (JP); Shinji Kobayashi, Musashino (JP); Sadaharu Oka, Musashino (JP)

(73) Assignee: Yokogawa Electric Corporation, Tokyo (JP)

(*) Notice: Subject to any disclaimer, the term of this patent is extended or adjusted under 35 U.S.C. 154(b) by 228 days.

(21) Appl. No.: 10/898,927

(22) Filed: Jul. 27, 2004

(65) Prior Publication Data
US 2005/0041903 A1 Feb. 24, 2005

(30) Foreign Application Priority Data
Aug. 21, 2003 (JP) .............................. 2003-297156

(51) Int. Cl.
*G02B 6/26* (2006.01)
(52) U.S. Cl. ................... 385/8; 385/2; 385/15; 385/14; 385/40
(58) Field of Classification Search .................... 385/2, 385/15, 16, 17, 18, 14, 41, 4
See application file for complete search history.

(56) References Cited

U.S. PATENT DOCUMENTS 4,737,003 A * 4/1988 Matsumura et al. ........... 385/18
4,784,451 A * 11/1988 Nakamura et al. ............. 385/18
5,044,712 A * 9/1991 Soref .......................... 385/16

(Continued)

FOREIGN PATENT DOCUMENTS

JP          5-165067         6/1993

(Continued)

OTHER PUBLICATIONS

Baojun LI et al., "1.55 μm reflection-type optical waveguide switch based on Si/Ge/Si plasma dispersion effect", Applied Physics Letters, vol. 75, No. 1, Jul. 5, 1999 pp. 1-3.

*Primary Examiner*—Frank G. Font
*Assistant Examiner*—James P. Hughes
(74) *Attorney, Agent, or Firm*—Westerman, Hattori, Daniels & Adrian, LLP.

(57) ABSTRACT

An optical switch in which the adverse effect of heating can be restrained is realized. An optical switch for switching a transmission path of an optical signal by a change in refractive index due to carrier injection comprises: a semiconductor substrate; an optical waveguide layer which is formed on the semiconductor substrate and in which an optical waveguide is formed, the optical signal being incident on the optical waveguide from one side, then branched into two at a halfway part and emitted from the optical waveguide; a first electrode formed on the optical waveguide layer and at a branching part of the optical waveguide; a second electrode formed on the optical waveguide layer and near the branching part of the optical waveguide; and a third electrode formed on the optical waveguide layer and on a side opposite to the first electrode as viewed from the second electrode; wherein when the optical switch is on, carriers are injected from the first and second electrodes, and when the optical switch is off, carriers are injected from the second and third electrodes.

11 Claims, 4 Drawing Sheets

U.S. PATENT DOCUMENTS

| | | | |
|---|---|---|---|
| 5,048,906 A * | 9/1991 | Okayama et al. | 385/16 |
| 5,107,514 A * | 4/1992 | Goto | 372/46.016 |
| 5,185,830 A * | 2/1993 | Nishimoto | 385/16 |
| 6,064,787 A * | 5/2000 | Castoldi | 385/41 |
| 6,374,018 B1 * | 4/2002 | Okayama | 385/16 |
| 6,597,830 B1 * | 7/2003 | Nakabayashi et al. | 385/24 |
| 6,633,692 B2 * | 10/2003 | Chua et al. | 385/16 |
| 6,891,986 B2 * | 5/2005 | Iio et al. | 385/14 |
| 2003/0026523 A1 * | 2/2003 | Chua et al. | 385/16 |
| 2003/0039425 A1 * | 2/2003 | Stoddard et al. | 385/2 |
| 2003/0156793 A1 * | 8/2003 | Kawamoto et al. | 385/41 |

FOREIGN PATENT DOCUMENTS

| | | |
|---|---|---|
| JP | 6-130236 | 5/1994 |
| JP | 6-289339 | 10/1994 |

\* cited by examiner

OPTICAL SWITCH

BACKGROUND OF THE INVENTION

1. Field of the Invention

This invention relates to an optical switch for switching the transmission path of an optical signal by a change in refractive index, and particularly to an optical switch in which adverse effects of heating can be restrained.

2. Description of the Related Art

The current communication networks such as LANs (local area networks) and WANs (wide area networks) usually employ a communication system that transmits information on electrical signals.

A communication method of transmitting information on optical signals is used only in trunk networks for transmitting a large quantity of data and some other networks. These networks use "point-to-point" communications and have not yet developed into communication networks that can be called "photonic networks".

To realize such a "photonic network", an "optical router", an "optical switching hub" and the like that have functions similar to the functions of devices such as a router and a switching hub for switching the destination of an electrical signal are needed.

Such devices need an optical switch for switching the transmission path at a high speed. There are optical switches using ferroelectric materials such as lithium niobate and PLZT (lead lanthanum zirconate titanate), and an optical switch having an optical waveguide formed in a semiconductor, to which carriers are injected to change the refractive index and thus switch the transmission path of an optical signal.

Recently, there also exists an optical switch in which a heater integrated on a flat glass optical waveguide generates heat to change the refractive index at the part where the heater is formed, thus making a switching operation.

The following are references of the related art of the conventional optical switch having an optical waveguide formed in a semiconductor, to which carriers are injected to change the refractive index and thus switch the transmission path of an optical signal:

JP-A-5-165067;
JP-A-6-130236;
JP-A-6-289339; and
Baujun Li, Guozheng Li, Enke Liu, Zuimin Jiang, Chengwen Pei and Xun Wang, Appl. Phys. Lette., pp. 1-3, 75 (1999).

FIGS. 1 and 2 are plan and sectional views showing an example of the conventional optical switch described in Baujun Li, Guozheng Li, Enke Liu, Zuimin Jiang, Chengwen Pei and Xun Wang, Appl. Phys. Lette., pp. 1-3, 75 (1999).

In FIG. 1, an X-shaped optical waveguide is formed in an optical waveguide layer 2 on a substrate 1, and a rectangular electrode 3 is formed at the intersection of the X-shaped optical waveguide. A rectangular electrode 4 is formed near the intersection of the X-shaped optical waveguide and parallel to the electrode 3. The electrode 3 and the electrode 4 form a pair of electrodes for injecting carriers.

FIG. 2 is a sectional view along a line A-A' in FIG. 1. A p-type optical waveguide layer 6 of SiGe or the like is formed on a p-type substrate 5 of Si or the like. An X-shaped optical waveguide is formed in the optical waveguide layer 6, and contact layers 7 and 8 are formed at the intersection of the X-shaped optical waveguide and near the intersection of the X-shaped optical waveguide, respectively.

An insulator film 11 of $SiO_2$ or the like is formed except on the contact layers 7 and 8. Electrodes 9 and 10 are formed on the contact layers 7 and 8, respectively.

The operation in the conventional example shown in FIGS. 1 and 2 will now be described. When the optical switch is off, no current is supplied to the electrode 3 (electrode 9) and the electrode 4 (electrode 10).

Therefore, the refractive index at the intersection of the X-shaped optical waveguide shown in FIG. 1 does not change. For example, an optical signal incident from an incidence end indicated by "PI01" in FIG. 1 travels straight through the intersection and is emitted from an emission end indicated by "PO01" in FIG. 1.

On the other hand, when the optical switch is on, electrons are injected from the electrode 3 (electrode 9) and holes are injected from the electrode 4 (electrode 10). Therefore, carriers (electrons and holes) are injected to the intersection.

Accordingly, the refractive index at the intersection of the X-shaped optical waveguide shown in FIG. 1 is lowered by a plasma effect. For example, an optical signal incident from the incidence end indicated by "PI01" in FIG. 1 is totally reflected by the low refractive index part generated at the intersection and is emitted from an emission end indicated by "PO02" in FIG. 1.

As a result, by supplying a current to the electrodes and thus injecting carriers (electrons and holes) to the intersection of the X-shaped optical waveguide to control the refractive index at the intersection, it is possible to control the position where the optical signal is emitted, that is, to switch the propagation path of the optical signal.

In the conventional example shown in FIGS. 1 and 2, carriers (electrons and holes) are injected and a part with a lowered refractive index is generated by plasma effect so that the optical signal is reflected. However, the injection of carriers (electrons and holes) generates heat and this heat causes increase in the refractive index in the part surrounding the heating part.

Therefore, the refractive index at the intersection of the X-shaped optical waveguide increases, affecting characteristics such as cross talk (extinction ratio). Moreover, the adverse effect of this heating varies depending on the frequency of switching.

SUMMARY OF THE INVENTION

It is an object of this invention to realize an optical switch in which the adverse effect of heating can be restrained.

DETAILED DESCRIPTION OF THE PREFERRED EMBODIMENTS

Figure 3:
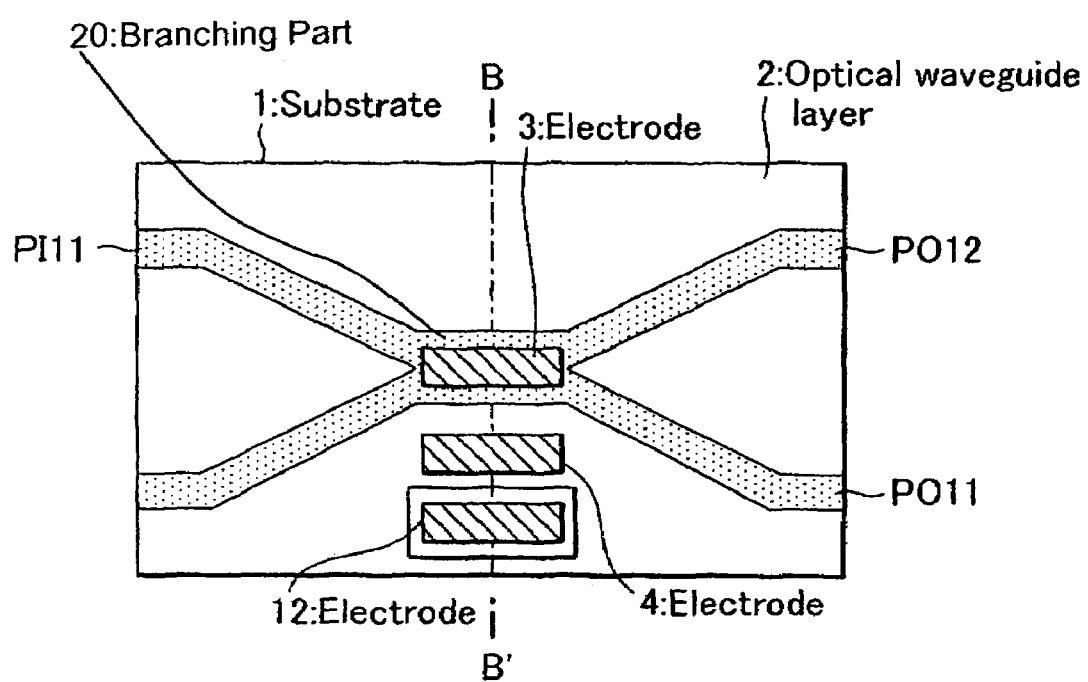
FIG. 3 is a plan view showing an embodiment of an optical switch according to this invention.
Figure 4:
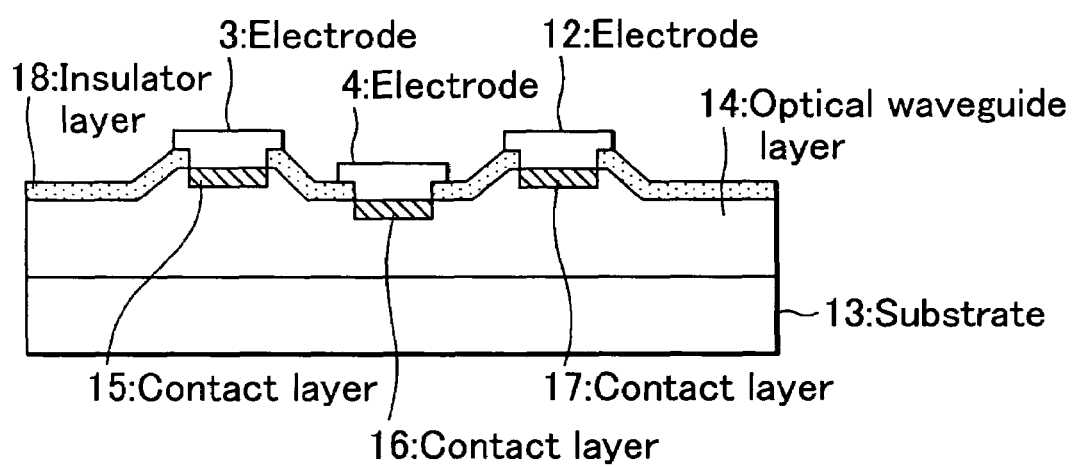
FIG. 4 is a sectional view showing the embodiment of the optical switch according to this invention.

Hereinafter, this invention will be described in detail with reference to the drawings. FIGS. 3 and 4 are plan and sectional views showing an embodiment of an optical switch according to this invention.

Figure 1:
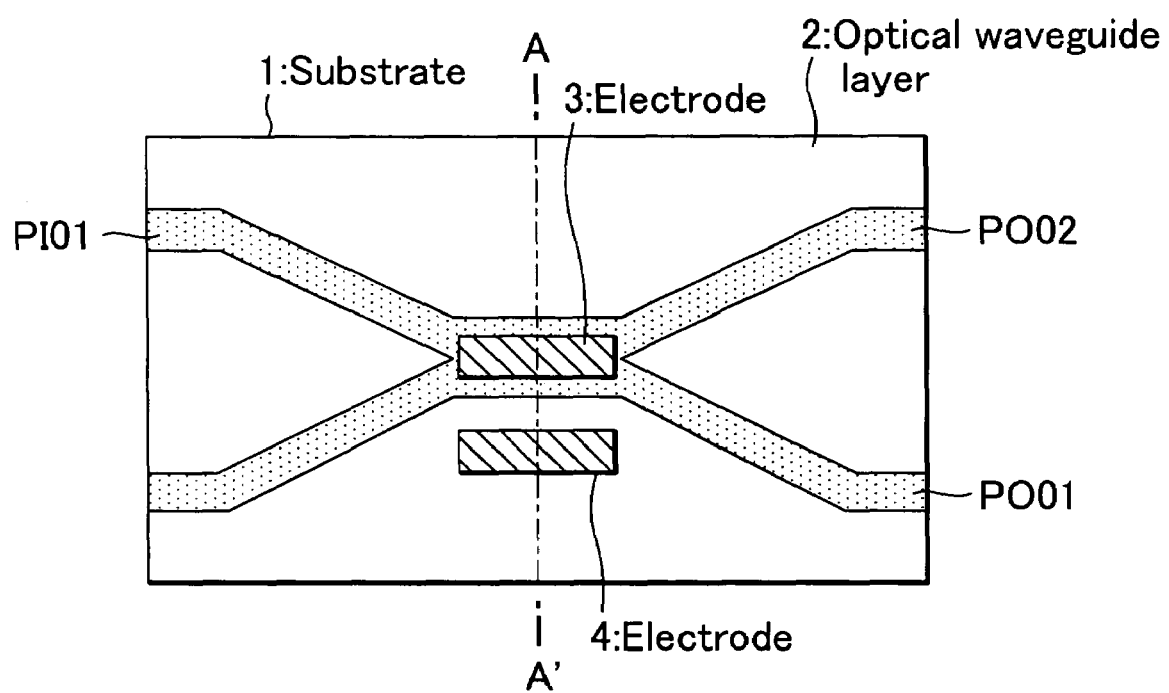
FIG. 1 is a plan view showing an exemplary conventional optical switch.
Figure 2:
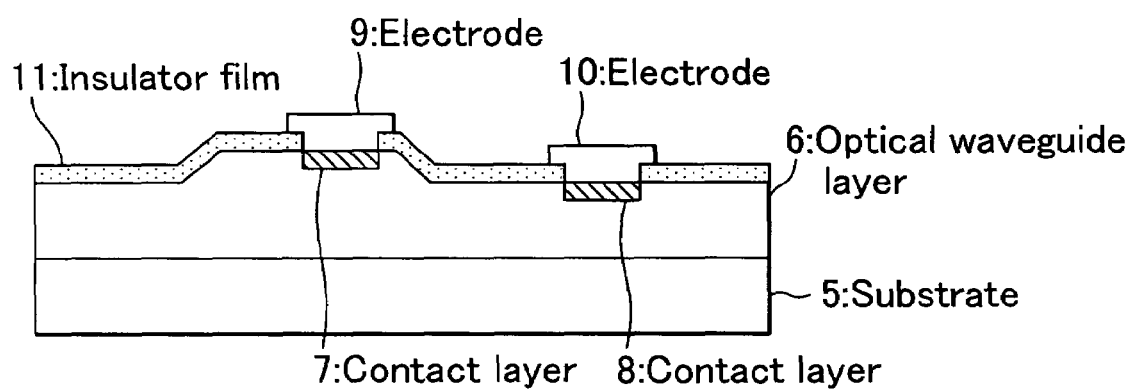
FIG. 2 is a sectional view showing the exemplary conventional optical switch.

In FIG. 3, a substrate 1, an optical waveguide layer 2, an electrode 3 and an electrode 4 are denoted by the same numerals as in FIG. 1. In FIG. 3, an X-shaped optical waveguide is formed in the optical waveguide layer 2 on the substrate 1. The rectangular electrode 3 is formed at the intersection of the X-shaped optical waveguide. The rectangular electrode 4 is formed near the intersection of the X-shaped optical waveguide and parallel to the electrode 3.

A rectangular electrode 12 is formed parallel the electrode 4 and on the side opposite to the side where the electrode 3 is formed.

FIG. 4 is a sectional view along a line B-B' in FIG. 3. The electrode 3, the electrode 4 and the electrode 12 are denoted by the same numerals as in FIG. 3.

In FIG. 4, a p-type optical waveguide layer 14 of SiGe or the like is formed on a p-type substrate 13 of Si or the like. An X-shaped optical waveguide is formed in the optical waveguide layer 14. Contact layers 15 and 16 are formed at the intersection of the X-shaped optical waveguide and near the intersection of the X-shaped optical waveguide, respectively.

On the side opposite to the contact layer 15 as viewed from the contact layer 16, a ridged structure similar to the intersection of the X-shaped optical waveguide is formed as a dummy, and a contact layer 17 is formed on the ridge part. However, an optical signal does not propagate to the dummy ridge part.

An insulator film 18 of $SiO_2$ or the like is formed except on the contact layers 15, 16 and 17. The electrodes 3, 4 and 12 are formed on the contact layers 15, 16 and 17, respectively.

The operation in the embodiment shown in FIGS. 3 and 4 will now be described. When the optical switch is on, electrons are injected from the electrode 3 and holes are injected from the electrode 4, as in the conventional example. Therefore, carriers (electrons and holes) are injected to the intersection.

Accordingly, the refractive index at the intersection of the X-shaped optical waveguide shown in FIG. 3 is lowered by a plasma effect. For example, an optical signal incident from an incidence end indicated by "PI11" in FIG. 3 is totally reflected by a low refractive index part generated at the intersection and is emitted from an emission end indicated by "PO12" in FIG. 3.

On the other hand, when the optical switch is off, electrons are injected from the electrode 12 and holes are injected from the electrode 4. Therefore, carriers (electrons and holes) are injected to the dummy ridge part.

While the carriers (electrons and holes) are injected to the dummy ridge part, the refractive index at the intersection of the X-shaped optical waveguide shown in FIG. 3 does not change. Therefore, for example, an optical signal incident from the incidence end indicated by "PI11" in FIG. 3 travels straight through the intersection and is emitted from an emission end indicated by "PO11" in FIG. 3.

In this state, even when the optical switch is off, the carriers (electrons and holes) are injected to the dummy ridge part from the electrode 4 and the electrode 12, and heat is generated as in the case where the optical switch is on.

Therefore, variance in the temperature at the intersection of the X-shaped optical waveguide due to on/off operation of the optical switch is restrained. In other words, variance in the refractive index at the intersection of the X-shaped optical waveguide is restrained.

As a result, by forming the ridged structure similar to the intersection of the X-shaped optical waveguide as a dummy on the side opposite to the electrode 3 as viewed from the electrode 4, then forming the electrode 12 on the ridge part, and injecting carriers (electrons and holes) from the electrode 3 and the electrode 4 when the optical switch is on, and from the electrode 4 and the electrode 12 when the optical switch is off, it is possible to restrain the adverse effect of heating.

In the embodiment shown in FIGS. 3 and 4, a SiGe-based semiconductor material is used as a semiconductor material. However, an AlGaAs-based semiconductor material or an InGaAsP-based semiconductor material may be used.

In the embodiment shown in FIGS. 3 and 4, the structure of the semiconductor material of the carrier injection area where the electrode 3, the electrode 4 and the electrode 12 are formed is not described at all. However, a diode structure or the like in which the contact layers 15 and 17 are of n-type while the contact layer 16 is of p-type may be employed. Alternatively, a diode structure in which the contact layers 15 and 17 are of p-type while the contact layer 16 is of n-type may be implemented.

In the embodiment shown in FIGS. 3 and 4, the rectangular electrode 4 is formed near the intersection of the X-shaped optical waveguide and parallel to the electrode 3. However, an electrode equivalent to the electrode 4 may be formed on the entire ear side of the semiconductor substrate 13.

In the embodiment shown in FIGS. 3 and 4, the structure of the semiconductor material in the carrier injection area where the electrode 3, the electrode 4 and the electrode 12 are formed is not described at all. However, if a hetero junction structure or a double hetero structure is employed, carriers can be effectively accumulated.

The contact layers 15 to 17 are for reducing the resistance between the electrodes and the optical waveguide. These contact layers are not essential constituent elements in the operation of the optical switch. The insulator film is not an essential constituent element, either.

In the embodiment shown in FIGS. 3 and 4, the optical waveguide layer 2 having the X-shaped optical waveguide is formed on the substrate 1. However, the optical waveguide may be y-shaped or of any other shape as long as it has two optical waveguide paths for emission.

The y-shaped optical waveguide is formed by one linear optical waveguide path that is branched at its halfway part at different angles. The branching part of the optical waveguide is found at the intersection of at least two optical wave guide paths. as shown by branching Part 20.

This invention has the following effect. A ridged structure similar the intersection of an optical waveguide is formed as a dummy on the side opposite to a first electrode as viewed from a second electrode, and a third electrode is formed on the ridge part. When the optical switch is on, carriers (electrons and holes) are injected from the first and second electrodes. When the optical switch is off, carriers (electrons and holes) are injected from the second and third electrodes. Therefore, the adverse effect of heating can be restrained.

What is claimed is:

1. An optical switch for switching a transmission path of an optical signal by a change in refractive index due to carrier injection, the optical switch comprising:
    a semiconductor substrate;
    an optical waveguide layer which is formed on the semiconductor substrate and in which an optical waveguide is formed, the optical signal being incident on the optical waveguide from one side, then branched into two at a halfway part and emitted from the optical waveguide;

a first electrode formed on the optical waveguide layer and at a branching part of the optical waveguide;

a second electrode formed on the optical waveguide layer and near the branching part of the optical waveguide; and a third electrode formed on the optical waveguide layer and on the same side of the optical waveguide layer as the second electrode, so that the second electrode is between the first electrode and third electrode;

wherein when the optical switch is on, carriers are injected from the first and second electrodes, and when the optical switch is off, carriers are injected from the second and third electrodes.

2. An optical switch for switching a transmission path of an optical signal by a change in refractive index due to carrier injection, the optical switch comprising:

a semiconductor substrate;

an optical waveguide layer which is formed on the semiconductor substrate and in which an optical waveguide is formed, the optical signal being incident on the optical waveguide from one side, then branched into two at a halfway part and emitted from the optical waveguide;

a first electrode formed on the optical waveguide layer and at a branching part of the optical waveguide;

a second electrode formed on an entire rear side of the semiconductor substrate; and a third electrode formed on the optical waveguide layer and on the same side of the optical waveguide layer as the second electrode, so that the second electrode is between the first electrode and third electrode;

wherein when the optical switch is on, carriers are injected from the first and second electrodes, and when the optical switch is off, carriers are injected from the second and third electrodes.

3. The optical switch as claimed in claim 1 or 2, wherein the third electrode is formed on the optical waveguide layer and on the halfway Part of the optical waveguide structure.

4. The optical switch as claimed in claim 1 or 2, wherein the area where the first, second and third electrodes are formed has a structure having a hetero junction or a double hetero structure.

5. The optical switch as claimed in claim 1, wherein the first, second and third electrodes are formed on first, second and third contact layers formed on the optical waveguide layer, and the first and third electrodes are made of an n-type semiconductor material, and the second electrode is made of a p-type semiconductor material.

6. The optical switch as claimed in claim 1, wherein the first, second and third electrodes are formed on first, second and third contact layers formed on the optical waveguide layer, and the first and third electrodes are made of a p-type semiconductor material, and the second electrode is made of an n-type semiconductor material.

7. The optical switch as claimed in one of claims 1, 2, 5 and 6, wherein the optical waveguide layer has an optical waveguide formed by two linear optical waveguide paths intersecting each other.

8. The optical switch as claimed in one of claims 1, 2, 5 and 6, wherein the optical waveguide layer has an optical waveguide formed by one linear optical waveguide path that is branched at its halfway part at different angles.

9. The optical switch as claimed in one of claims 1, 2, 5 and 6, wherein the semiconductor substrate and the optical waveguide layer are made of an AlGaAs-based semiconductor material.

10. The optical switch as claimed in one of claims 1, 2, 5 and 6, wherein the semiconductor substrate and the optical waveguide layer are made of an InGaAsP-based semiconductor material.

11. The optical switch as claimed in one of claims 1, 2, 5 and 6, wherein the semiconductor substrate and the optical waveguide layer are made of a SiGe-based semiconductor material.

* * * * *